United States Patent
Nishioka

(10) Patent No.: US 9,609,573 B2
(45) Date of Patent: Mar. 28, 2017

(54) PATH CONTROL METHOD, WIRELESS COMMUNICATION SYSTEM, PATH CONTROL DEVICE, AND NON-TRANSITORY COMPUTER READABLE MEDIUM

(71) Applicant: NEC Corporation, Tokyo (JP)

(72) Inventor: Jun Nishioka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/436,718

(22) PCT Filed: Jul. 10, 2013

(86) PCT No.: PCT/JP2013/004276
§ 371 (c)(1),
(2) Date: Apr. 17, 2015

(87) PCT Pub. No.: WO2014/064869
PCT Pub. Date: May 1, 2014

(65) Prior Publication Data
US 2016/0165512 A1 Jun. 9, 2016

(30) Foreign Application Priority Data
Oct. 23, 2012 (JP) ................................ 2012-233493

(51) Int. Cl.
*H04W 40/14* (2009.01)
*H04W 40/02* (2009.01)
*H04L 12/729* (2013.01)

(52) U.S. Cl.
CPC .......... *H04W 40/02* (2013.01); *H04L 45/125* (2013.01); *H04W 40/14* (2013.01)

(58) Field of Classification Search
None
See application file for complete search history.

(56) References Cited

U.S. PATENT DOCUMENTS

2003/0002444 A1* 1/2003 Shin ................... H04L 41/12
370/238
2003/0021227 A1* 1/2003 Lee ................... H04L 41/0681
370/228

(Continued)

FOREIGN PATENT DOCUMENTS

EP 2 312 887 A1 4/2011
EP 2 395 792 A1 12/2011

(Continued)

OTHER PUBLICATIONS

International Search Report (ISR) (PCT Form PCT/ISA/210), in PCT/JP2013/004276, dated Sep. 17, 2013.
Extended European Search Report dated May 24, 2016.

*Primary Examiner* — Bunjob Jaroenchonwanit
(74) *Attorney, Agent, or Firm* — McGinn IP Law Group, PLLC.

(57) ABSTRACT

Provided are a path control method, a wireless communication system, a path control device, and a non-transitory computer readable medium which are capable of securing efficient traffic accommodation, while maintaining communication quality. The path control method controls a communication path by selecting one path from among a plurality of path candidates with respect to a specific piece of traffic in a network constituted of a radio link provided with an adaptive modulation function. A requested band of the piece of traffic is compared with an allocatable band allocatable to a first path candidate that is included in the plurality of path candidates and that satisfies a degree of stability requested by the piece of traffic by a first modulation method. As a result of the comparison, when the requested band of the piece of traffic is larger than the allocatable band, a penalty cost due to transmission using a band usable by a second modulation method having a lower degree of stability is given to the first path candidate so that (Continued)

the first path candidate is less likely to be selected as compared with the other path candidates for selecting one path from among the plurality of path candidates.

10 Claims, 3 Drawing Sheets

(56) References Cited

U.S. PATENT DOCUMENTS

| | | | |
|---|---|---|---|
| 2003/0103449 A1* | 6/2003 | Barsheshet | H04L 12/42 370/222 |
| 2009/0016358 A1* | 1/2009 | Lee | H04L 12/2854 370/395.53 |
| 2009/0147722 A1* | 6/2009 | Ramachandran | H04L 45/122 370/315 |
| 2010/0014528 A1* | 1/2010 | Amir | H04L 45/04 370/400 |
| 2011/0170526 A1* | 7/2011 | Hsieh | H04W 40/02 370/338 |
| 2011/0268401 A1* | 11/2011 | Wei | H04B 10/2531 385/122 |
| 2012/0113821 A1* | 5/2012 | Foster | H04L 45/00 370/250 |
| 2013/0128757 A1* | 5/2013 | Chowdhary | H04W 24/00 370/252 |
| 2013/0287398 A1* | 10/2013 | Frankel | H04B 10/5053 398/65 |
| 2015/0200727 A1* | 7/2015 | Stiffler | H04B 10/25759 398/115 |

FOREIGN PATENT DOCUMENTS

| | | |
|---|---|---|
| EP | 2 512 168 A1 | 10/2012 |
| JP | 2009-504090 A | 1/2009 |
| JP | 2012-049902 A | 3/2012 |
| WO | WO 2004/109536 A1 | 12/2004 |
| WO | WO 2012/020783 A1 | 2/2012 |

* cited by examiner

PATH CONTROL METHOD, WIRELESS COMMUNICATION SYSTEM, PATH CONTROL DEVICE, AND NON-TRANSITORY COMPUTER READABLE MEDIUM

TECHNICAL FIELD

The present invention relates to a path control method, a wireless communication system, a path control device, and a non-transitory computer readable medium, and more particularly to path control for use in a mobile backhaul network.

BACKGROUND ART

As the information technology progresses in recent years, a demand for data communication traffic by data communication or the like is increasing. Under this circumstance, broadband communication in a network and reduction in operation cost have been required. A network constituted of radio links such as an FWA (Fixed broadband Wireless Access) employing a wireless system utilizing a frequency of a millimeter wave band or the like capable of broadband transmission is utilized in a mobile phone network or the like.

An FWA is a system configured to connect a plurality of locally placed base stations to each other by wireless communication so as to connect to a core network in a mobile communication system such as a mobile phone. This system has the advantages that the work period can be shortened, as compared with a wired network, and that the cost required for cable placing can be reduced. In recent years, this system is employed by mobile telecommunications carriers, as a connection line for connecting between wireless base stations in a mobile network via a radio link.

A network for configuring an FWA is constituted of radio links. Therefore, communication quality of the network varies according to an SNR (Signal to Noise Ratio) of a receiving signal. In view of the above, in order to implement further broadband communications using a radio link, an adaptive modulation technique has been paid attention to. The adaptive modulation technique is a technique, in which a modulation method having a highest transmission efficiency is adaptively obtained from a radio condition of a radio link for using the modulation method. The adaptive modulation technique makes it possible to perform optimum wireless communication depending on the radio environment, and enhancement of frequency efficiency can be expected.

PTL 1 discloses a path control method, in which a modulation method capable of stably using a radio link is estimated from a history of modulation methods in the past or the like, in view of a point that the band of a radio link changes according to adaptive modulation, and communication quality requested by traffic is secured by using the link band of the estimated modulation method.

However, selecting a radio link of modulation method capable of being used stably under the consideration of stability may lower the traffic accommodation efficiency. Further, according to the path control method as described above, the number of times of hopping the path increases, and the path is likely to be redundant, resulting in an increase in delay even in a path having a high degree of stability.

CITATION LIST

Patent Literature

PTL 1: Published Japanese Translation of PCT International Publication for Patent Application No. 2009-504090

SUMMARY OF INVENTION

Technical Problem

In the related technique, it is not possible to secure efficient traffic accommodation, while maintaining communication quality in computing a path of traffic.

In view of the above-described problems, an object of the present invention is to provide a path control method, a wireless communication system, a path control device, and a non-transitory computer readable medium which enable to secure efficient traffic accommodation, while maintaining communication quality.

Solution to Problem

A path control method according to an aspect selects one path from among a plurality of path candidates with respect to a specific piece of traffic in a network constituted of a radio link provided with an adaptive modulation function. The path control method is provided with a comparing step of comparing a requested band of the piece of traffic, and an allocatable band allocatable to a first path candidate that is included in the plurality of path candidates and that satisfies a degree of stability requested by the piece of traffic by a first modulation method; and a selecting step of giving a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison for selecting one path from among the plurality of path candidates.

A wireless communication system according to another aspect is provided with a device which controls a communication path by selecting one path from among a plurality of path candidates with respect to a specific piece of traffic in a network constituted of a radio link provided with an adaptive modulation function. The wireless communication system is provided with a comparing means which compares a requested band of the piece of traffic, with an allocatable band allocatable to a first path candidate that is included in the plurality of path candidates and that satisfies a degree of stability requested by the piece of traffic by a first modulation method; and a selecting means which gives a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison for selecting one path from among the plurality of path candidates.

A path control device according to yet another aspect is provided with a control unit having an adaptive modulation function, and a wireless antenna which wirelessly communicates with a communication device. The control unit controls a communication path by selecting one path from among a plurality of path candidates with respect to a specific piece of traffic in a network connected to the communication device by a radio link. The path control device is further provided with a comparing means which compares a requested band of the piece of traffic, with an allocatable band allocatable to a first path candidate that is included in the plurality of path candidates and that satisfies a degree of stability requested by the piece of traffic by a first modulation method; and a selecting means which gives a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison for selecting one path from among the plurality of path candidates.

A non-transitory computer readable medium storing a program which causes a computer to execute path control according to still another aspect is operative to select one path from among a plurality of path candidates with respect to a specific piece of traffic in a network constituted of a radio link provided with an adaptive modulation function. The non-transitory computer readable medium stores the program which causes the computer to execute: a comparing step of comparing a requested band of the piece of traffic, and an allocatable band allocatable to a first path candidate that is included in the plurality of path candidates and that satisfies a degree of stability requested by the piece of traffic by a first modulation method; and a selecting step of giving a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison for selecting one path from among the plurality of path candidates.

Advantageous Effects of Invention

According to the present invention, it is possible to provide a path control method, a wireless communication system, a wireless communication device, and a non-transitory computer-readable medium which are capable of securing efficient traffic accommodation, while maintaining communication quality.

DESCRIPTION OF EMBODIMENTS

Figure 1:
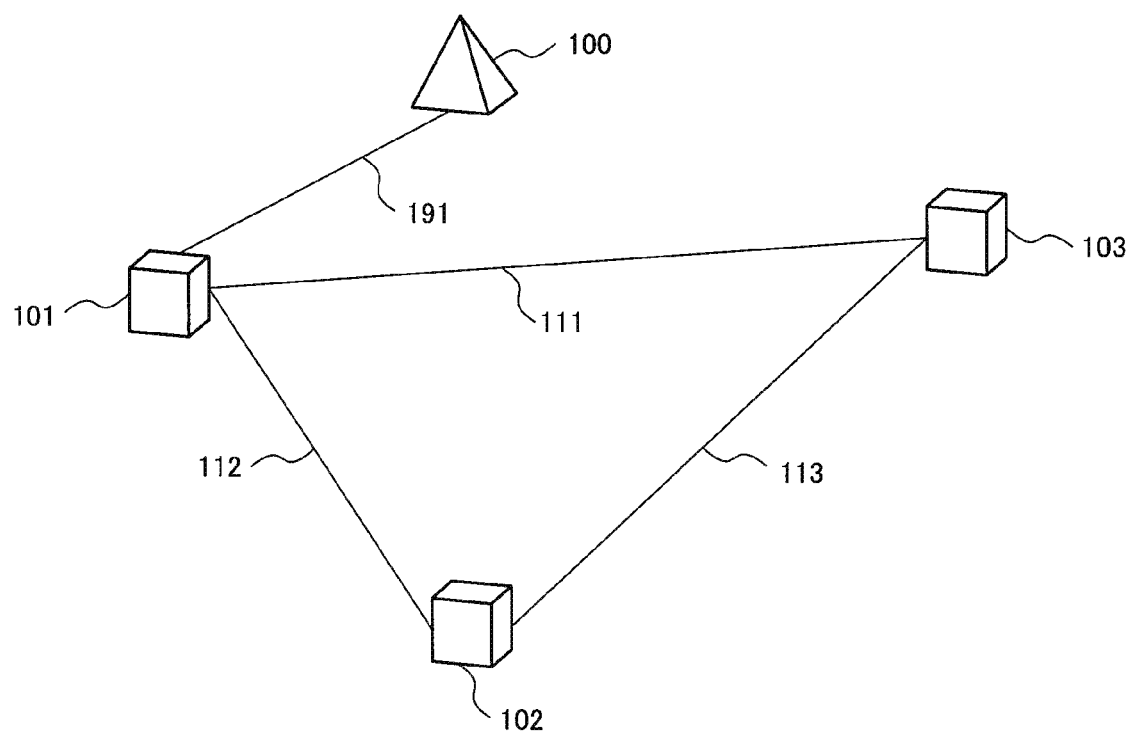
FIG. 1 is a diagram illustrating a configuration example of a network according to an exemplary embodiment of the present invention.

A path control method according to an exemplary embodiment of the present invention is a method for controlling a communication path by selecting one path from among a plurality of path candidates with respect to a specific piece of traffic in a network constituted of a radio link provided with an adaptive modulation function. The path control method is implemented by a wireless communication system 200 for use in a network, which is constituted of a path control device 100 and communication devices 101 to 103, as illustrated in FIG. 1. A path computation is performed by the path control device 100. The wireless communication system 200 includes a wired or radio link 191 for connecting between the path control device 100 and the communication device 101, a radio link 111 for connecting between the communication device 101 and the communication device 103, a radio link 112 for connecting between the communication device 101 and the communication device 102, and a radio link 113 for connecting between the communication device 102 and the communication device 103.

The path control device 100 manages the entirety of the network. The path control device 100 performs all the operations such as receiving a new flow and finishing the flow. The path control device 100 periodically acquires information relating to link quality of a radio link (a bit error rate, a modulation method in use) from each of the communication devices 101 to 103. The path control device 100 computes a degree of stability with respect to each modulation method for each link, and performs a path computation.

Figure 2:
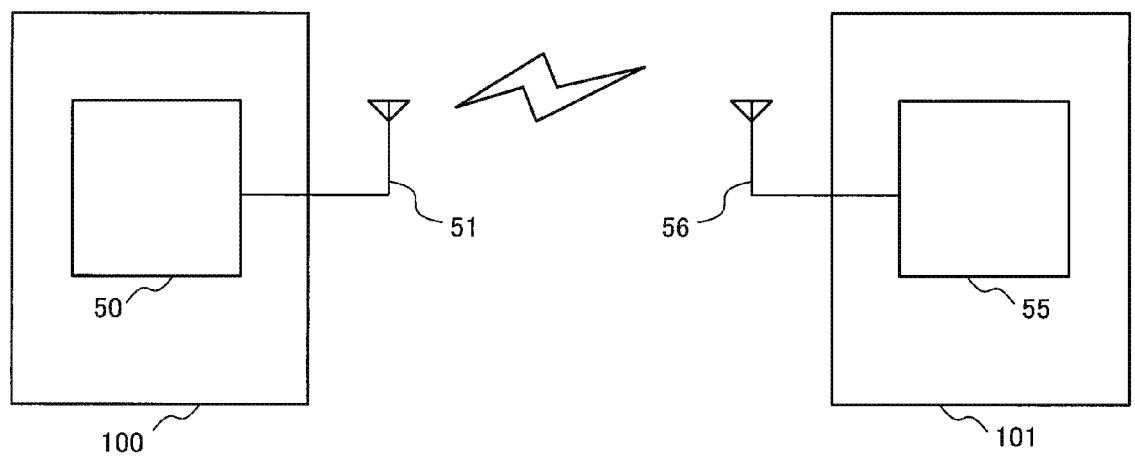
FIG. 2 is a configuration diagram of a path control device and of a communication device according to the exemplary embodiment of the present invention.

FIG. 2 is a configuration diagram of the path control device 100 and of the communication device 101. The path control device 100 is provided with a control unit 50 having an adaptive modulation function, and a wireless antenna 51 for wirelessly communicating with the communication device 101. The communication device 101 is provided with a control unit 55 for selecting a communication path, and a wireless antenna 56 for wirelessly communicating with the path control device 100 and with the communication devices 102 and 103. The wireless devices 102 and 103 also have the same configuration as the wireless device 101.

Figure 3:
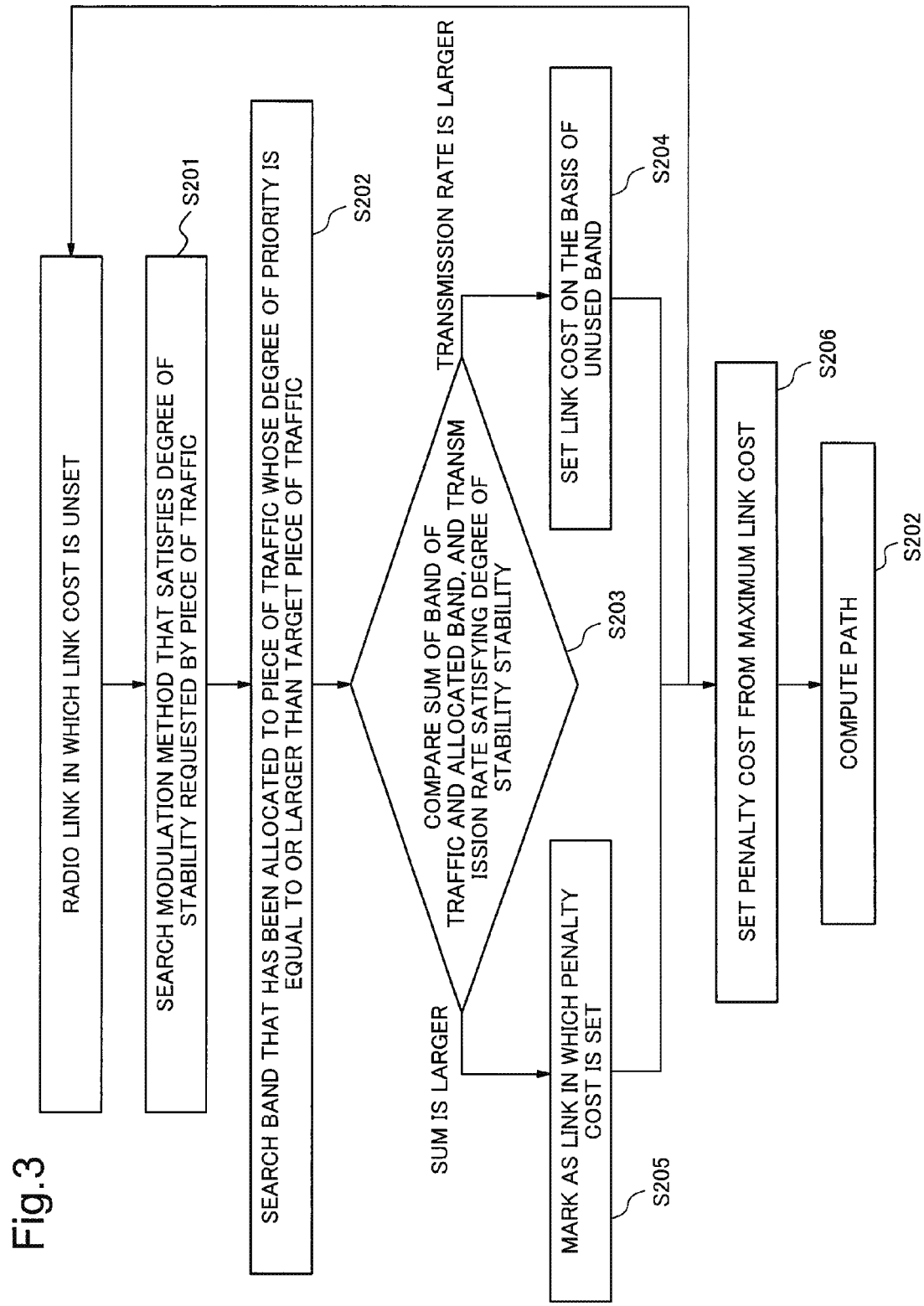
FIG. 3 is a flowchart illustrating a basic operation sequence of the path control device according to the exemplary embodiment of the present invention.

Next, a processing to be carried out by the path control device 100 is described using FIG. 3. The path control device 100 executes cost computation of each radio link, and thereafter, executes a path computation, on the basis of a result of the cost computation.

The path control device 100 periodically calculates a degree of stability with respect to each modulation method for each radio link, and computes a degree of stability with respect to each allocated band.

The degree of stability of a link is computed in the same method as the computation method disclosed in PTL 1, for instance. The degree of stability Avail(m) of the modulation method m is obtained from a ratio of time used by the own modulation method m or used by a modulation method of higher order than the own modulation method m with respect to a predetermined time T.

A case is described, in which a relationship between the modulation methods m1, m2, m3, and m4 is such that m1<m2<m3<m4, in other words, the modulation method m1 is a modulation method of lowest order, the modulation method m2 is a modulation method of second lowest order, the modulation method m3 is a modulation method of second highest order, and the modulation method m4 is a modulation method of highest order. The degree of stability Avail(m3) of the modulation method m3 is obtained by the following equation (1), $$\mathrm{Avail}(m3)=(T\_m3+T\_m4)/T \quad (1)$$

where T_m3 and T_m4 respectively represent times used by the modulation method m3 and by the modulation method m4 during the time T.

In this way, the degree of stability with respect to each band for a radio link is calculated, on the basis of history information of the modulation methods used by the radio link in the past.

The path control device 100 executes the following processing 1) to 3) for each radio link.

1) The modulation method M1 of highest order among the modulation methods that satisfy the degree of stability Avail(tr) requested by traffic is obtained (Step S201).

2) The band that has been allocated to a piece of traffic whose degree of priority is equal to or higher than the degree of priority of the target piece of traffic is obtained (Step S202). The degree of priority is determined by priority control of judging the order of priority of data flowing through the traffic. The priority control is a control of labeling the order of priority at different levels to the packets flowing through a packet communication network such as an IP network, and of providing different QoSs (Qualities of Service) to the flows of traffic for controlling the order of reading data. Specifically, a value representing the order of priority is set to the header of each packet, and the order of priority of a packet whose nodes such as a router are stored in a buffer is obtained to judge the order of priority of each flow of traffic.

3) The sum of the requested band of traffic and the allocated band is compared with the transmission rate by the modulation method M1 obtained in 1) (Step S203).

When transmission rate≥requested band of traffic+ allocated band    A)

This is a case, in which the transmission rate is equal to or larger than the sum of the requested band of traffic and the allocated band. In other words, this is a case, in which transmission can be sufficiently performed by the modulation method M1.

In this case, a difference between the current requested band and the allocated band, or an inverse of a value based on the usable unused band is used as a link cost (Step S204). In this example, a difference between the current requested band and the allocated band, or an inverse of a value based on the usable unused band is used as a link cost.

Alternatively, it is possible to carry out a processing of calculating a link cost in such a manner that the link cost decreases, as the usable unused band increases. As a method for calculating a link cost, it is also possible to obtain the value of a link cost, on the basis of the usable unused band and using a table in which the usable unused band and the value of a link cost are associated with each other in advance.

When transmission rate<requested band of traffic+ allocated band    B)

This is a case, in which the transmission rate is smaller than the sum of the requested band of traffic and the allocated band. In other words, this is a case, in which transmission by the modulation method M1 is insufficient. In this case, when transmission is performed using the same path, it is necessary to transmit by a modulation method (e.g. M2) having a lower degree of stability than the modulation method M1 and capable of accommodating the requested band of traffic. For this reason, a penalty cost is set so as to apply a weight which makes it difficult to select a path in path selection, taking into consideration that communication quality is degraded due to transmission by the modulation method (e.g. M2) having a low degree of stability relative to the modulation method (e.g. M1) having a high degree of stability.

In this case, marking is applied to a radio link in which a penalty cost is set (Step S205). In other words, information representing that a target radio link is a radio link in which a penalty cost is set is associated with the identification information of the radio link.

Next, a path is computed.

4) The link cost of the radio link marked as a radio link in which a penalty cost is set is set (Step S206).

A value obtained by multiplying a tradeoff coefficient x with a worst value of the link cost set in the other radio links is set as the penalty cost. When all the radio links are marked as a radio link in which a penalty cost is set, "1" is used as the tradeoff coefficient x.

The tradeoff coefficient x to be used in the link cost regarding the penalty cost is computed as a value representing an index indicating how much the traffic prioritizes a shortest path over reliability. In other words, the tradeoff coefficient x is computed as a coefficient (weight) to be used when traffic is accommodated in a link whose degree of stability is lower than the requested degree of stability.

The tradeoff coefficient x can be calculated as follows, when Avail(M2) represents a degree of stability of a usable band in the target link, and Avail(tr) represents a degree of stability requested by traffic, $$y=\log(1-\text{Avail}(M2))-\log(1-\text{Avail}(tr))=\log((1-\text{Avail}(M2))/(1-\text{Avail}(tr))) \quad x=\text{pref}(y) \quad (2)$$

where M2 is a modulation method of lowest order having a degree of stability required for accommodating the requested band of traffic by the radio link, and y is a degree of reducing the degree of stability in the target link. A logarithm is required in order to match the dimensions numerically in comparing with another link cost. Further, the function pref(y) is an arbitrary increasing function. The value of the tradeoff coefficient x increases, as the degree of stability of M2 is lowered.

The function pref(y) is a factor for use in determining the penalty cost. The function pref(y) is a value reflecting a degree of stability, which is determined in accordance with a difference in the relative height between a degree of stability of the modulation method (e.g. M1) that satisfies a degree of stability requested by traffic in a path candidate to be computed, and a degree of stability of the modulation method (e.g. M2) capable of accommodating the requested band of the traffic in the path candidate. The value reflecting a degree of stability is a value reflecting a negative factor that affects communication quality by a change from a modulation method having a sufficiently high degree of stability to a modulation method having a low degree of stability. It is conceived that when the difference between the two degrees of stability is large, the negative factor that affects communication quality is large. Therefore, the value reflecting a degree of stability becomes a large value. As the difference in the degree of stability between the two modulation methods increases, the penalty cost increases. As a result, a path candidate other than the path candidate to be computed is likely to be selected.

For instance, the following functions are used as an equation for obtaining the tradeoff coefficient x.

$$\text{function 1:} x=\text{pref}(y)=y+2 \quad \text{function 2:} x=\text{pref}(y)=y+0.5 \quad (3)$$

When the function 1 is used, the penalty cost increases, as compared with the case of using the function 2. Therefore, among the path candidates, a path whose penalty cost is computed using the function 1 is less likely to be selected, as compared with the other paths.

Further, in the pref function, which one of the functions is to be applied is determined in advance for each piece of traffic. Any one of the functions is notified from the path demander to the path control device when the path of traffic is set. Alternatively, the path control device may determine the pref function to be applied in accordance with the types of data to be transmitted in the traffic (such as voice data or text data).

5) The path with minimum cost is computed (Step S207)

When a path includes a radio link in which a penalty cost is used in path setting, the path control device 100 causes the communication devices 101 to 103 on the target radio link to mark the piece of traffic using the path. Then, the communication devices 101 to 103 on the target radio link set the degree of priority of the marked piece of traffic one rank lower than the other piece of traffic having the same degree of priority. With this configuration, when there is a traffic jam between the target piece of traffic and the other piece of traffic, a packet in the target piece of traffic is not selected, because the degree of priority of the target piece of traffic is lower than the degree of priority of the other piece of traffic. In other words, the order of priority of the packet in the target piece of traffic is set to be low.

A path control method according to the exemplary embodiment of the present invention is described referring to a specific example of computation. In this example, it is assumed that a network is configured as illustrated in FIG. 1. In other words, a network is constituted of the path control device 100, and the communication devices 101 to 103 under the control of the path control device 100. The path control device 100 manages the entirety of the network, including all the operations such as receiving a new flow and finishing the flow. The path control device 100 periodically acquires information relating to link quality of a radio link (a bit error rate, a modulation method in use) from each of the communication devices 101 to 103. The path control device 100 computes a degree of stability with respect to each modulation method for each link, and performs a path computation.

The wireless communication system 200 includes the wired or radio link 191 for connecting between the path control device 100 and the communication device 101, the radio link 111 for connecting between the communication device 101 and the communication device 103, the radio link 112 for connecting between the communication device 101 and the communication device 102, and the radio link 113 for connecting between the communication device 102 and the communication device 103.

In the following description, a path that directly connects the communication device 101 and the communication device 103 is called as "the radio link 111", and a path that connects the communication device 101 and the communication device 103 via the communication device 102 is called as "the radio links 112 and 113". The radio link 111 has the number of times of hopping of 1, and the radio links 112 and 113 have the number of times of hopping of 2. In this example, as the number of times of hopping increases, the transmission delay amount increases.

Table 1 illustrates a degree of stability and a securable band of each modulation method for each of the radio links 111, 112, and 113. In the following, as examples of the modulation method, QPSK (Quadrature Phase Shift Keying), 16 QAM (16 Quadrature Amplitude Modulation), and 32 QAM (32 Quadrature Amplitude Modulation) are used.

TABLE 1

Modulation method and degree of stability in radio link

| Modulation method | QPSK | 16QAM | 32QAM |
|---|---|---|---|
| Securable band [Mbps] | 40 | 40 | 28 |
| Degree of stability [%] | 99.99 | 99.9 | 99.5 |

The following is the degrees of stability requested by the pieces of traffic, each of which has a degree of priority, with respect to each degree of priority of traffic in accordance with the degree of stability of each modulation method i.e. 99.99%, 99.9%, and 99.5%.

Degree of priority 1: 99.99%

Degree of priority 2: 99.9%

Degree of priority 3: 99.5%

In other words, the piece of traffic, whose degree of priority is 1 i.e. the order of priority is highest, requests the degree of stability 99.99% by the modulation method QPSK. Further, the piece of traffic, whose degree of priority is 2 i.e. the order of priority is second highest, requests the degree of stability 99.9% by the modulation method 16 QAM. Furthermore, the piece of traffic, whose degree of priority is 3 i.e. the order of priority is lowest, requests the degree of stability 99.5% by the modulation method 32 QAM.

A) Path Computation 1

A path computation for the piece of traffic whose requested band is 30 Mbps (the degree of priority: 1, the degree of stability: 99.99%, the degree of stability which is possible with modulation method QPSK) is performed between the radio links 101 to 103. First of all, a modulation method which satisfies the degree of stability 99.99% is searched in each link. All the links satisfy the condition that the modulation method QPSK is usable. Then, it is checked whether a piece of traffic having a high order of priority can be accommodated by the transmission rate of QPSK in each link. Table 1 shows that there is a sufficiently wide unused band so that a link cost is computed.

Link cost=1/(unused band that satisfies the specified degree of stability). The link cost of each link is calculated as follows.

(radio link 111, radio link 112, radio link 113): 1/40    (4)

The cost of a path of the radio links 112 and 113 which connect the communication device 101 and the communication device 103 via the communication device 102 is 1/40+1/40=2/40.

Further, the cost of a path of the radio link 111 which directly connects the communication device 101 and the communication device 103 is 1/40. When the costs of the two path candidates are compared, the cost of the path of the radio link 111 is lower than the cost of the path of the radio links 112 and 113 so that the path of the radio link 111 is selected. 30 Mbps out of 40 Mbps, which can be secured by the modulation method QPSK in the radio link 111, is allocated to the piece of traffic.

The allocated band of each radio link in a state where the path computation 1 is completed is as illustrated in Table 2.

TABLE 2

| | Allocated band | | |
|---|---|---|---|
| Link | 111 | 112 | 113 |
| Allocated band (QPSK) | 30 | 0 | 0 |
| Allocated band (16QAM) | 0 | 0 | 0 |
| Allocated band (32QAM) | 0 | 0 | 0 |

B) Path Computation 2

Next, a path computation for the piece of traffic whose requested band is 20 Mbps (the degree of priority: 1, the degree of stability: 99.99%, the degree of stability which is possible with modulation method QPSK) is performed. When the link cost is computed, 30 Mbps out of 40 Mbps, which is the allocated band by the modulation method QPSK, is already used in the radio link 111 by the piece of traffic allocated by the path computation 1. As a result, the requested band 20 Mbps of the piece of traffic is larger than the unused band 10 Mbps that satisfies the specified degree of stability (30+20>40). Therefore, a penalty cost is set in the link cost of the radio link 111.

A cost obtained by multiplying the maximum value of the link costs of the other links with the coefficient x is set as the penalty cost to be set in the radio link 111. The degree of stability of the band (16 QAM) usable in the target link is 99.9%, and the degree of stability requested by the piece of traffic is 99.99%. Therefore, the tradeoff coefficient x when x=pref(y)=y+2 is used as a pref function is as follows.

$$\text{pref}(\log(1-0.999)-\log(1-0.9999))=3 \quad (5)$$

Therefore, the penalty link cost to be set in the target link is as follows.

$$3*1/40=3/40 \quad (6)$$

The band 40 Mbps remains in the other radio links 112 and 113 for the modulation method QPSK. Therefore, the link cost of the radio links 112 and 113 is calculated as follows by applying the same computation as the path computation 1.

$$\text{(radio link 112, radio link 113)}:1/40 \quad (7)$$

The sum of the costs of the two path candidates is calculated as follows.

$$\text{(radio links 112 and 113)}:1/40+1/40=2/40 \quad (8)$$

$$\text{(radio link 111)}:3/40 \quad (9)$$

When the paths candidates are compared, the path of the radio links 112 and 113 whose cost is smaller is selected. The used bands after the computation processing in this case are updated as follows.

TABLE 3

| | Used band with respect to each degree of priority | | |
|---|---|---|---|
| Link | 111 | 112 | 113 |
| Used band (QPSK) | 30 | 20 | 20 |
| Used band (16QAM) | 0 | 0 | 0 |
| Used band (32QAM) | 0 | 0 | 0 |

When a piece of traffic, in which x=pref(y)=y+0.5 is used as a pref function, is used as the piece of traffic having the same degree of priority as the other piece of traffic, the sums of the path candidates are respectively calculated as follows, because the tradeoff coefficient x=1.5.

$$\text{(radio links 112 and 113)}:1/40+1/40=2/40 \quad (10)$$

$$\text{(radio link 111)}:1.5/40 \quad (11)$$

Therefore, in this case, the path of the radio link 111 is selected.

C) Path Computation 3

Next, a path computation of the piece of traffic whose requested band is 20 Mbps (the degree of priority: 3, the degree of stability: 99.5%, the degree of stability by the modulation method 32 QAM or higher is requested) is performed. There are three unused bands which satisfy the degree of stability requested by the piece of traffic. The link cost of each link is computed as follows, using an inverse of a value based on the unused band.

$$\text{(radio link 111)}:1/((40+40+28)-30)=1/78 \quad (12)$$

$$\text{(radio link 112, radio link 113)}:1/((40+40+28)-20) \\ =1/88 \quad (13)$$

$$\text{(radio links 112 and 113)}: 2/88 \quad (14)$$

$$\text{(radio link 111)}: 1/78 \quad (15)$$

As a result of the expressions (14) and (15), the radio link 111 whose cost is smaller is selected as the path. When a band whose degree of stability is lowest among the unused bands that satisfy the degree of stability requested by the piece of traffic is allocated, the allocation status is as illustrated in Table 4.

TABLE 4

| | Used band with respect to each degree of priority | | |
|---|---|---|---|
| Link | 111 | 112 | 113 |
| Used band (QPSK) | 30 | 20 | 20 |
| Used band (16QAM) | 0 | 0 | 0 |
| Used band (32QAM) | 20 | 0 | 0 |

D) Path Computation 4

Lastly, a path computation of the piece of traffic whose requested band is 20 Mbps (the degree of priority: 1, the degree of stability: 99.99%, the degree of stability which is possible with modulation method QPSK) is performed. The radio link 111 does not satisfy the degree of stability of the unused band (16 QAM), which is requested by the piece of traffic. Therefore, a penalty cost is set in the radio link 111. The link cost of the radio link 112, 113 is as follows.

$$\text{(radio link 112, radio link 113)}: 1(40-20)=1/20 \quad (16)$$

Therefore, the link cost of the radio links 112 and 113 is 2/20.

It is assumed that the piece of traffic is a piece of traffic which prefers a shortest path, in other words, which prioritizes a transmission speed over stability. In view of the above, x=pref(y)=y+0.5 is set in advance as a pref function, which calculates a relatively small value as the penalty cost.

Specifically, the penalty cost is as follows.
x=pref(log(1−0.999)−log(1−0.9999))=log(1−0.999)−log(1−0.9999)+0.5=1.5. The penalty cost of the radio link 111 is calculated as follows.

$$\text{(radio link 111)}:1/20*1.5=3/40 \quad (17)$$

As a result of comparing the sums of the link costs of each path, the radio link 111 whose sum of the link costs is smallest is selected as a path.

Lastly, the used band of each link is as illustrated in Table 5.

TABLE 5

| | Used band with respect to each degree of priority | | |
|---|---|---|---|
| Link | 111 | 112 | 113 |
| Used band (QPSK) | 30 | 20 | 20 |
| Used band (16QAM) | 20 | 0 | 0 |
| Used band (32QAM) | 20 | 0 | 0 |

As described above, the path computations make it possible to set a path whose degree of stability is high for a piece of traffic in which stability is prioritized, and to set a path whose number of times of hopping is small for a piece of traffic in which delay is prioritized. As an applied example of the present invention, the invention may be used in a mobile backhaul network in a mobile phone network.

According to the exemplary embodiment, a penalty cost computation is performed individually for each piece of traffic, even when the pieces of traffic have the same degree of priority. Therefore, it is possible to set the penalty cost to be low, when the traffic prefers a shortest path, and it is possible to set the penalty cost to be high, when the traffic prioritizes stability. Thereby, it is made possible to set a path according to the preference of traffic.

The present invention is not limited to the aforementioned exemplary embodiment, but may be modified as necessary, as far as such modifications do not depart from the gist of the invention. For instance, the invention is also applicable to higher communications standards such as communications standards of fourth generation or higher (e.g. LTE-Advanced, IMT-Advanced, WiMAX2).

<Another Exemplary Embodiment>

As another exemplary embodiment, the function of the path control device 100 may be implemented by the configuration of the communication devices 101 to 103.

Further, the path control device 100 described in the exemplary embodiment may be implemented, using a semiconductor processing device including an ASIC (Application Specific Integrated Circuit). Furthermore, this method may be implemented by causing a computer system including at least one processor (e.g. a microprocessor, an MPU or a DSP (Digital Signal Processor)) to execute a program. Specifically, the above configuration is implemented by creating one or more programs including a command group for causing a computer system to execute an algorithm relating to bias voltage control, which has been described using a flowchart and the like, and by supplying the program to the computer.

The programs can be stored using various types of non-transitory computer readable media, and can be supplied to a computer. The non-transitory computer readable media include various types of tangible storage media. Examples of the non-transitory computer readable media are a magnetic recording medium (e.g. a flexible disk, a magnetic tape, a hard disk drive), a magneto-optical recording medium (e.g. a magneto-optical disk), a CD-ROM (Read Only Memory), a CD-R, a CD-R/W, and a semiconductor memory (e.g. a mask ROM, a PROM (Programmable ROM), an EPROM (Erasable PROM), a flash ROM, and a RAM (Random Access memory)). Further, the program may be supplied to a computer by various types of transitory computer readable media. Examples of the transitory computer readable media include an electrical signal, a light signal, and an electromagnetic wave. A transitory computer readable medium is capable of supplying a program to a computer via a wired communication path such as a power line and an optical fiber, or via a wireless communication path.

A part or all of the aforementioned exemplary embodiment may be described as the following Supplemental Notes. The present invention described by the exemplary embodiment, however, is not limited to the following.

(Supplemental Note 1)

A path control method for controlling a communication path by selecting one path from among a plurality of path candidates with respect to a specific piece of traffic in a network constituted of a radio link provided with an adaptive modulation function, including:

a comparing step of comparing a requested band of the piece of traffic, and an allocatable band allocatable to a first path candidate that is included in the plurality of path candidates and that satisfies a degree of stability requested by the piece of traffic by a first modulation method; and a selecting step of giving a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison for selecting one path from among the plurality of path candidates.

(Supplemental Note 2)

The path control method according to Supplemental Note 1, wherein the penalty cost is determined on the basis of a unique value that is defined in advance with respect to each piece of traffic.

(Supplemental Note 3)

The path control method according to Supplemental Note 1 or 2, wherein the penalty cost is determined on the basis of a value reflecting a degree of stability that is determined in accordance with a difference in relative height between a degree of stability of the first modulation method in the first path candidate, and a degree of stability of the second modulation method in the first path candidate.

(Supplemental Note 4)

The path control method according to Supplemental Note 1, further including:

setting a link cost that is determined in accordance with an unused area of a path candidate with respect to the path candidate having the unused area capable of accommodating the requested band of the piece of traffic, wherein the penalty cost is calculated by multiplying a tradeoff coefficient with a maximum link cost in the other path candidates, the tradeoff coefficient being determined on the basis of at least one of a unique value that is defined in advance with respect to each piece of traffic, and a value reflecting a degree of stability determined in accordance with a difference in relative height between a degree of stability of the first modulation method in the first path candidate, and a degree of stability of the second modulation method in the first path candidate.

(Supplemental Note 5)

The path control method according to any one of Supplemental Notes 1 to 4, further including:

calculating a degree of stability with respect to each band of the radio link, on the basis of history information of the modulation methods used by the radio link in the past.

(Supplemental Note 6)

A path control method for controlling a communication path by selecting one path from among a plurality of path candidates including a first path candidate as a shortest path, and a second path candidate whose number of times of hopping is larger than the first path candidate with respect to a specific piece of traffic in a network constituted of a radio link provided with an adaptive modulation function, including:

a comparing step of comparing a requested band of the piece of traffic, and an allocatable band allocatable to a first path candidate that is included in the plurality of path candidates and that satisfies a degree of stability requested by the piece of traffic by a first modulation method; and a selecting step of giving a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison for selecting one path from among the plurality of path candidates.

(Supplemental Note 7)

The path control method according to Supplemental Note 6, wherein the penalty cost is determined on the basis of a unique value that is defined in advance with respect to each piece of traffic.

(Supplemental Note 8)

The path control method according to Supplemental Note 6 or 7, wherein the penalty cost is determined on the basis of a value reflecting a degree of stability that is determined in accordance with a difference in relative height between a degree of stability of the first modulation method in the first path candidate, and a degree of stability of the second modulation method in the first path candidate.

(Supplemental Note 9)

A wireless communication system provided with a device for controlling a communication path by selecting one path from among a plurality of path candidates with respect to a specific piece of traffic in a network constituted of a radio link provided with an adaptive modulation function, including:

a comparing means which compares a requested band of the piece of traffic, with an allocatable band allocatable to a first path candidate that is included in the plurality of path candidates and that satisfies a degree of stability requested by the piece of traffic by a first modulation method; and a selecting means which gives a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison for selecting one path from among the plurality of path candidates.

(Supplemental Note 10)

The wireless communication system according to Supplemental Note 9, wherein the penalty cost is determined on the basis of a unique value that is defined in advance with respect to each piece of traffic.

(Supplemental Note 11)

The wireless communication system according to Supplemental Note 9 or 10, wherein the penalty cost is determined on the basis of a value reflecting a degree of stability that is determined in accordance with a difference in relative height between a degree of stability of the first modulation method in the first path candidate, and a degree of stability of the second modulation method in the first path candidate.

(Supplemental Note 12)

The wireless communication system according to Supplemental Note 9, including:

setting a link cost that is determined in accordance with an unused area of a path candidate with respect to the path candidate having the unused area capable of accommodating the requested band of the piece of traffic, wherein the penalty cost is calculated by multiplying a tradeoff coefficient with a maximum link cost in the other path candidates, the tradeoff coefficient being determined on the basis of at least one of a unique value that is defined in advance with respect to each piece of traffic, and a value reflecting a degree of stability determined in accordance with a difference in relative height between a degree of stability of the first modulation method in the first path candidate, and a degree of stability of the second modulation method in the first path candidate.

(Supplemental Note 13)

The wireless communication system according to any one of Supplemental Notes 9 to 12, further including:

calculating a degree of stability with respect to each band of the radio link, on the basis of history information of the modulation methods used by the radio link in the past.

(Supplemental Note 14)

A wireless communication system provided with a control device for controlling a communication path by selecting one path from among a plurality of path candidates including a first path candidate as a shortest path, and a second path candidate whose number of times of hopping is larger than the first path candidate with respect to a specific piece of traffic in a network constituted of a radio link provided with an adaptive modulation function, including:

a comparing means which compares a requested band of the piece of traffic, with an allocatable band allocatable to a first path candidate that is included in the plurality of path candidates and that satisfies a degree of stability requested by the piece of traffic by a first modulation method; and a selecting means which gives a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison for selecting one path from among the plurality of path candidates.

(Supplemental Note 15)

The wireless communication system according to Supplemental Note 14, wherein the penalty cost is determined on the basis of a unique value that is defined in advance with respect to each piece of traffic.

(Supplemental Note 16)

The wireless communication system according to Supplemental Note 14 or 15, wherein the penalty cost is determined on the basis of a value reflecting a degree of stability that is determined in accordance with a difference in relative height between a degree of stability of the first modulation method in the first path candidate, and a degree of stability of the second modulation method in the first path candidate.

(Supplemental Note 17)

The wireless communication system according to Supplemental Note 14, further including:

setting a link cost that is determined in accordance with an unused area of a path candidate with respect to the path candidate having the unused area capable of accommodating the requested band of the piece of traffic, wherein the penalty cost is calculated by multiplying a tradeoff coefficient with a maximum link cost in the other path candidates, the tradeoff coefficient being determined on the basis of at least one of a unique value that is defined in advance with respect to each piece of traffic, and a value reflecting a degree of stability determined in accordance with a difference in relative height between a degree of stability of the first modulation method in the first path candidate, and a degree of stability of the second modulation method in the first path candidate.

(Supplemental Note 18)

A path control device, including:

a control unit provided with an adaptive modulation function; and a wireless antenna which wirelessly communicates with a communication device, wherein the control unit controls a communication path by selecting one path from among a plurality of path candidates with respect to a specific piece of traffic in a network connected to the communication device by a radio link, and the path control device further includes:

a comparing means which compares a requested band of the piece of traffic, with an allocatable band allocatable to a first path candidate that is included in the plurality of path candidates and that satisfies a degree of stability requested by the piece of traffic by a first modulation method; and a selecting means which gives a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison for selecting one path from among the plurality of path candidates.

(Supplemental Note 19)

A non-transitory computer readable medium storing a program which causes a computer to select one path from among a plurality of path candidates with respect to a specific piece of traffic in a network constituted of a radio link provided with an adaptive modulation function, the program causing the computer to execute:

a comparing step of comparing a requested band of the piece of traffic, and an allocatable band allocatable to a first path candidate that is included in the plurality of path candidates and that satisfies a degree of stability requested by the piece of traffic by a first modulation method; and a selecting step of giving a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison for selecting one path from among the plurality of path candidates.

The invention of the present application has been described referring to the exemplary embodiment. The invention of the present application, however, is not limited by the foregoing description. The configuration and the details of the invention of the present application may be modified in various ways comprehensible to a person skilled in the art within the technical scope of the invention.

This application claims the priority based on Japanese Patent Application No. 2012-233493 filed on Oct. 23, 2012, and all of the disclosure of which is hereby incorporated.

REFERENCE SIGNS LIST

50 Control unit
51 Wireless antenna
55 Control unit
56 Wireless antenna
100 Path control device
101 Communication device
102 Communication device
103 Communication device
111 Radio link
112 Radio link
113 Radio link
191 Radio link
200 Wireless communication system

The invention claimed is:

1. A path control method for controlling a communication path by selecting one path from among a plurality of path candidates with respect to a specific piece of traffic in a network constituted of a radio link provided with an adaptive modulation function, the method comprising:

comparing a requested band of the piece of traffic, with an allocatable band allocatable to a first path candidate that is included in the plurality of path candidates and that satisfies a degree of stability requested by the piece of traffic by a first modulation method; and giving a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison, and selecting one path from among the plurality of path candidates.

2. The path control method according to claim 1, wherein the penalty cost is determined on a basis of a predetermined unique value with respect to each piece of traffic.

3. The path control method according to claim 1, wherein the penalty cost is determined on a basis of a value reflecting a degree of stability that is determined in accordance with a difference in relative height between a degree of stability of the first modulation method in the first path candidate, and a degree of stability of the second modulation method in the first path candidate.

4. The path control method according to claim 1, further comprising:

setting a link cost that is determined in accordance with an unused area of a path candidate with respect to the path candidate having the unused area capable of accommodating the requested band of the piece of traffic, wherein the penalty cost is calculated by multiplying a tradeoff coefficient with a maximum link cost in an other path candidates, the tradeoff coefficient being determined on a basis of at least one of a predetermined unique value with respect to each piece of traffic, and a value reflecting a degree of stability determined in accordance with a difference in relative height between a degree of stability of the first modulation method in the first path candidate, and a degree of stability of the second modulation method in the first path candidate.

5. The path control method according to claim 1, further comprising:
calculating a degree of stability with respect to each band of the radio link, on a basis of history information of the modulation methods used by the radio link in the past.

6. A path control method for controlling a communication path by selecting one path from among a plurality of path candidates including a first path candidate as a shortest path, and a second path candidate whose number of times of hopping is larger than the first path candidate with respect to a specific piece of traffic in a network constituted of a radio link provided with an adaptive modulation function, the path control method comprising:
comparing a requested band of the piece of traffic, with an allocatable band allocatable to a first path candidate that is included in the plurality of path candidates and that satisfies a degree of stability requested by the piece of traffic by a first modulation method; and
giving a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison, and selecting one path from among the plurality of path candidates.

7. A wireless communication system provided with a device for controlling a communication path by selecting one path from among a plurality of path candidates with respect to a specific piece of traffic in a network constituted of a radio link provided with an adaptive modulation function, the wireless communication system comprising:
at least one processor coupled to a memory storing instructions for executing:
comparing a requested band of the piece of traffic, with an allocatable band allocatable to a first path candidate that is included in the plurality of path candidates and that satisfies a degree of stability requested by the piece of traffic by a first modulation method; and
giving a penalty cost due to transmission using a band usable by a second modulation method whose degree of stability is lower than the first modulation method to the first path candidate so that the first path candidate is less likely to be selected, when the requested band of the piece of traffic is larger than the allocatable band, as a result of the comparison, and selects one path from among the plurality of path candidates.

8. A wireless communication system provided with a control device for controlling a communication path by selecting one path from among a plurality of path candidates including a first path candidate as a shortest path, and a second path candidate whose number of times of hopping is larger than the first path candidate with respect to a specific piece of traffic in a network constituted of a radio link provided with an adaptive modulation function, the wireless communication system comprising:
at least one processor coupled to a memory storing instructions for executing:
comparing a requested band of the piece of traffic, with an allocatable band allocatable to a first path candidate that is included in the plurality of path candidates and that satisfies a degree of stability requested by the piece of traffic by a first modulation method; and
giving a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison, and select one path from among the plurality of path candidates.

9. A path control device, comprising:
a controller provided with an adaptive modulation function;
a wireless antenna which wirelessly communicates with a communication device, wherein the controller controls a communication path by selecting one path from among a plurality of path candidates with respect to a specific piece of traffic in a network connected to the communication device by a radio link; and
at least one processor configured to:
compare a requested band of the piece of traffic, with an allocatable band allocatable to a first path candidate that is included in the plurality of path candidates and that satisfies a degree of stability requested by the piece of traffic by a first modulation method; and
give a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison, and selects one path from among the plurality of path candidates.

10. A non-transitory computer readable medium storing a program which causes a computer to select one path from among a plurality of path candidates with respect to a specific piece of traffic in a network constituted of a radio link provided with an adaptive modulation function, the program causing the computer to execute:
comparing a requested band of the piece of traffic, with an allocatable band allocatable to a first path candidate that is included in the plurality of path candidates and that satisfies a degree of stability requested by the piece of traffic by a first modulation method; and
giving a penalty cost due to transmission using a band usable by a second modulation method whose degree of stability is lower than the first modulation method to the first path candidate so that the first path candidate is less likely to be selected, when the requested band of the piece of traffic is larger than the allocatable band as a result of the comparison, and selecting one path from among the plurality of path candidates.

\* \* \* \* \*